(12) United States Patent
Kumar et al.

(10) Patent No.: US 11,899,691 B2
(45) Date of Patent: Feb. 13, 2024

(54) DATA MANAGEMENT USING DYNAMIC DATA FLOW AND PATTERN MATCHING

(71) Applicant: Dell Products L.P., Round Rock, TX (US)

(72) Inventors: Dhilip S. Kumar, Bangalore (IN); Ajay Maikhuri, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 20 days.

(21) Appl. No.: 17/547,540

(22) Filed: Dec. 10, 2021

(65) Prior Publication Data

US 2023/0185828 A1 Jun. 15, 2023

(51) Int. Cl.
*G06F 16/00* (2019.01)
*G06F 16/28* (2019.01)

(52) U.S. Cl.
CPC .................. *G06F 16/285* (2019.01)

(58) Field of Classification Search
CPC ....................................... G06F 16/285
USPC .......................................... 707/739
See application file for complete search history.

(56) References Cited

U.S. PATENT DOCUMENTS

| 9,280,577 B1* | 3/2016 | Hines | G06F 16/48 |
| | | | 707/707 |
| 2015/0278342 A1* | 10/2015 | Jang | G06F 16/48 |
| | | | 707/739 |
| 2017/0116305 A1* | 4/2017 | Kapoor | G06F 16/211 |
| | | | 707/707 |

OTHER PUBLICATIONS

Wikipedia, "Gestalt Pattern Matching," https://en.wikipedia.org/wiki/Gestalt_Pattern_Matching, Jan. 30, 2021, 4 pages.
Wikipedia, "Information Gain in Decision Trees," https://en.wikipedia.org/wiki/Information_gain_in_decision_trees, Dec. 9, 2021, 9 pages.
Wikipedia, "Random Forest," https://en.wikipedia.org/wiki/Random_forest, Dec. 10, 2021, 12 pages.

* cited by examiner

*Primary Examiner* — Alexandria Y Bromell
(74) *Attorney, Agent, or Firm* — Ryan, Mason & Lewis, LLP

(57) ABSTRACT

Techniques are disclosed for data management in an information processing system. For example, a method comprises analyzing one or more data sources, wherein each of the one or more data sources comprise a set of metadata and usage information associated with the set of metadata. The method then determines at least one of data definitions and data classifications for the one or more sets of metadata across the one or more data sources, and stores the at least one of data definitions and data classifications for the one or more sets of metadata in a repository.

20 Claims, 11 Drawing Sheets

FIG. 5

| EXAMPLE | |
|---|---|
| SUPPLIER NAME | A VENDOR WHO SUPPLIES MATERIAL |
| CUSTOMER NAME | PERSON/ORGANIZATION WHO BUYS PRODUCTS |
| EMPLOYEE NAME | AN EMPLOYEE OF THE ORGANIZATION |
| AGE | AGE OF THE PERSON |
| GENDER | GENDER OF THE PERSON |
| QUANTITY | QUANTITY OF THE PRODUCT/ITEM |
| DATE | DATE FOR CONTEXT |
| CCN | CURRENT COMPANY NUMBER |
| ADDRESS | ADDRESS OF EMPLOYEE/CUSTOMER/VENDOR |
| BUYER NAME | AN EMPLOYEE WHO BUYS THE MATERIAL |
| SKU | STOCK KEEPING UNIT |
| STANDARD COST | THE COST OF THE INVENTORY |
| BUSINESS UNIT | A DIVISION OR A FUNCTION IS OF THE COMPANY |

FIG. 6A

| | 1 | 2 | 3 | 4 | 5 | 6 | 7 | 8 | 9 | 10 | 11 | 12 |
|---|---|---|---|---|---|---|---|---|---|---|---|---|
| S1 | C | U | S | T | O | M | E | R | N | A | M | E |
| S2 | C | U | S | T | I | N | A | M | E | A | M | E |

FIG. 6B

| | 1 | 2 | 3 | 4 | 5 | 6 | 7 | 8 | 9 | 10 | 11 | 12 |
|---|---|---|---|---|---|---|---|---|---|---|---|---|
| S1 | C | U | S | T | O | M | E | R | N | A | M | E |
| S2 | C | U | S | T | I | N | A | M | E | A | M | E |

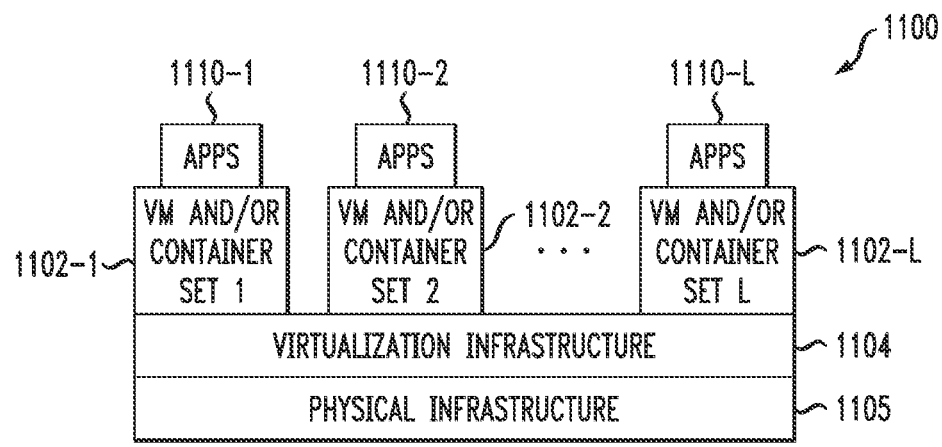
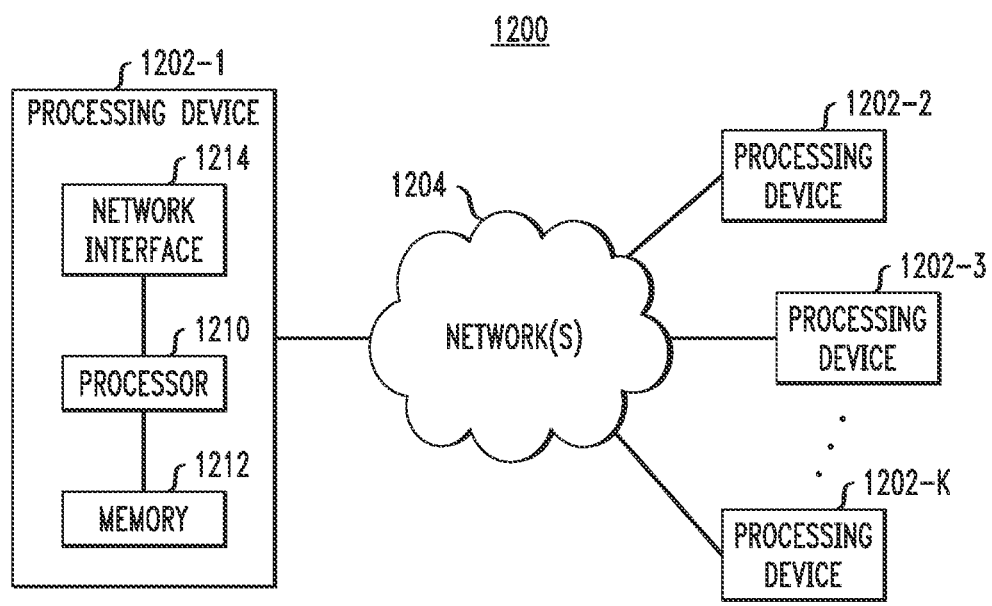

DATA MANAGEMENT USING DYNAMIC DATA FLOW AND PATTERN MATCHING

FIELD

The field relates generally to information processing systems, and more particularly to data management in such information processing systems.

BACKGROUND

Business organizations, as well as other entities, are undergoing a digital transformation in terms of the data that they generate, acquire, or otherwise maintain. One of the primary reasons for such a digital transformation is due to the vision of treating their data as an asset. However, the data associated with an organization is typically generated and/or accessed by many different individuals and groups in the organization (e.g., application engineers, data engineers, product owners, data stewards, data security engineers, business owners, etc.), wherein each may have a different purpose for the data. As such, organizations experience technical problems managing their data given the many different purposes there may be for individuals/groups to generate or access such data.

SUMMARY

Illustrative embodiments provide techniques for data management in an information processing system.

For example, in an illustrative embodiment, a method comprises analyzing one or more data sources, wherein each of the one or more data sources comprise a set of metadata and usage information associated with the set of metadata. The method then determines at least one of data definitions and data classifications for the one or more sets of metadata across the one or more data sources, and stores the at least one of data definitions and data classifications for the one or more sets of metadata in a repository.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments enable, inter alia, crawling/scanning (i.e., analyzing) data sources, as well as usage information about the data, to identify and define metadata and build a corpus of fields and patterns to tag metadata definitions. Further, in one or more illustrative embodiments, such techniques may comprise identifying data classifications through usage and country-based policies/doctrines.

These and other illustrative embodiments include, without limitation, apparatus, systems, methods and computer program products comprising processor-readable storage media.

BRIEF DESCRIPTION OF THE DRAWINGS

FIG. 5 illustrates a data field dictionary example according to an illustrative embodiment.

FIGS. 6A and 6B illustrate a string matching algorithm example according to an illustrative embodiment.

FIGS. 11 and 12 respectively illustrate examples of processing platforms that may be utilized to implement a data management system having intelligent data definition and classification functionalities according to one or more illustrative embodiments.

DETAILED DESCRIPTION

Figure 1:
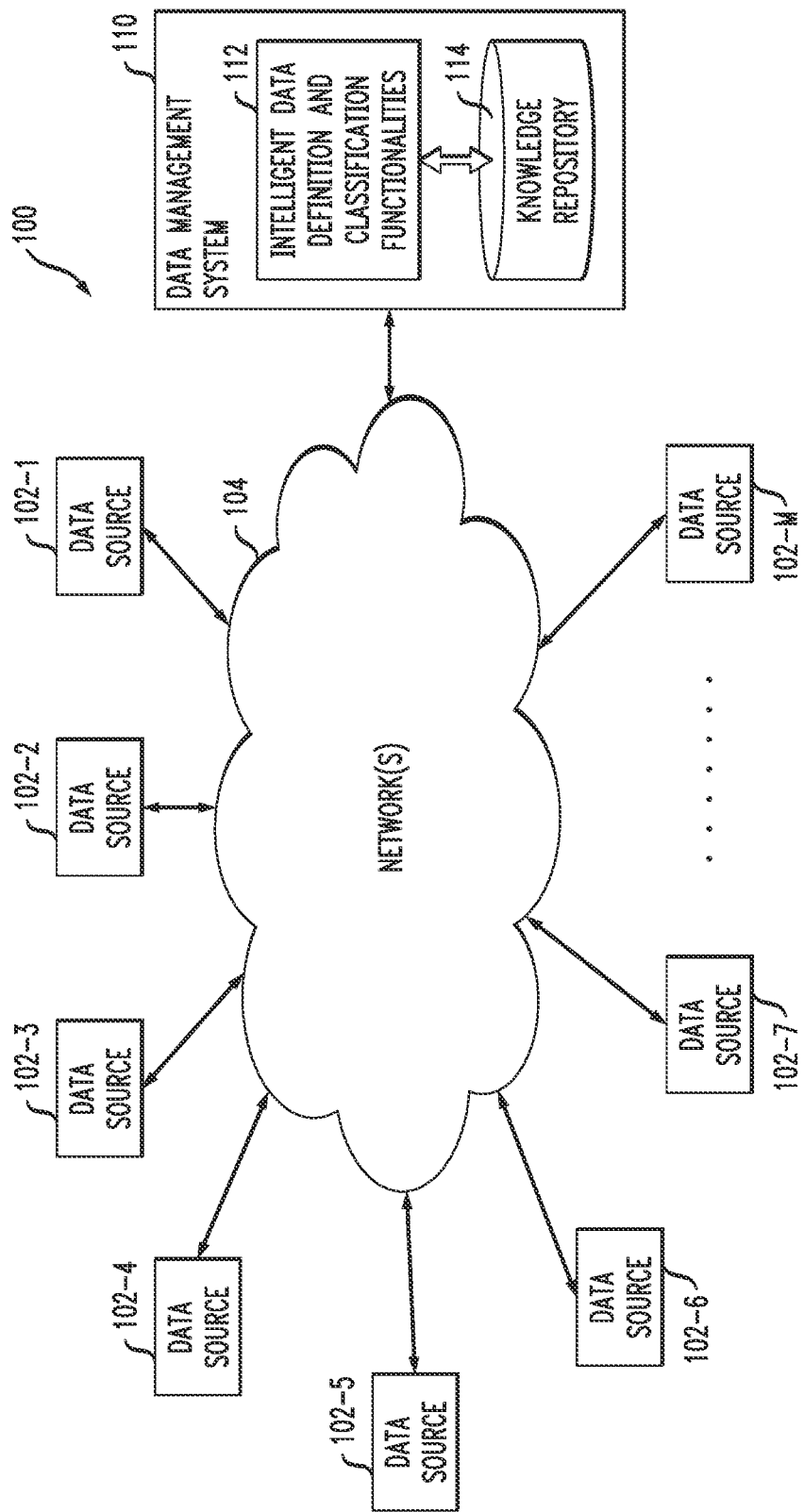
FIG. 1 illustrates an information processing system with a data management system having intelligent data definition and classification functionalities according to one or more illustrative embodiments.

As mentioned above in the background section, since data associated with an organization is typically generated and/or accessed by many different individuals and groups in the organization, managing the data can present technical problems for the organization. Typically, metadata describes the business and/or technical characteristics of the data used within an organization, i.e., the metadata is data about the data. Often, the metadata is not documented, which leads to data silos being created within the organization which can then cause misleading key performance indicators (KPIs) to be generated. Furthermore, the metadata becomes an asset of only the subject matter experts (SMEs) within the organization rather than assets shared with the many different individuals/groups of the organization. It is realized herein that the only way for others in the organization to learn about the metadata is through a knowledge sharing protocol or casual conversation with SMEs. Still further, it is realized that data classification of organization data is also largely a manual process driven by SMEs. Even with software tools that attempt to capture the data at the database level, SMEs play a significant manual role in defining the description and classification.

Additional technical problems flow from this lack of proper data management in existing databases and applications. For example, existing data management lacks consistency in field definition, coding business rules, and calculations. Also, historically, there has been insufficient focus on metadata management, resulting in data users having no knowledge of transformations, calculations, and derivations already existing within the database and/or application code. Still further, SMEs for individual business units within an organization interpret business rules from their own perspective, leading to variances in data for the end-user once the data is processed. The overall concept of digital transformation brings many other technical challenges such as decentralized coding, polyglot database usages where data moves from one database to another, and lack of functional documentation. Also, as organizations adopt a data lake paradigm, data is stored in so-called "schema on read" storages thus adding additional significant complexity to data management processes.

Illustrative embodiments overcome the above and other technical problems associated with data management by providing intelligent data definition and classification techniques. For example, in one or more illustrative embodiments, such techniques may comprise crawling/scanning (analyzing) data sources, as well as usage information about the data, to identify and define metadata and build a corpus of fields and patterns to tag metadata definitions. Further, in one or more illustrative embodiments, such techniques may comprise identifying data classifications through usage and country-based policies/doctrines.

As illustratively used herein, the term data classification refers to the process of analyzing structured and/or unstructured data and organizing it into categories (classes) based on criteria such as, but not limited to, file type, contents, other metadata, etc. Further, as illustratively used herein, the term data definition is a syntax for creating and modifying database objects, e.g., one example of a data definition as will be used herein is a data field definition.

FIG. 1 illustrates an information processing system 100 with a data management system with intelligent data definition and classification functionalities according to one or more illustrative embodiments. As shown, information processing system 100 comprises data sources 102-1, 102-2, 102-3, 102-4, 102-5, 102-6, 102-7, . . . , 102-M (collectively referred to as data sources 102 or individually as data source 102) operatively coupled to a network(s) 104 along with a data management system 110 which is configured to comprise intelligent data definition and classification functionalities 112 and a knowledge repository 114 according to one or more illustrative embodiments. Network(s) 104 may comprise one or more data communication networks and protocols that enable data management system 110 to access data sources 102.

As will be explained in further detail herein, intelligent data definition and classification functionalities 112 provide for auto-learning and auto-harvesting metadata field definitions and data classification for storage in knowledge repository 114 that enable, inter alia, an organization or other entity to quickly/early find, understand, protect and/or ethically use data.

Figure 2:
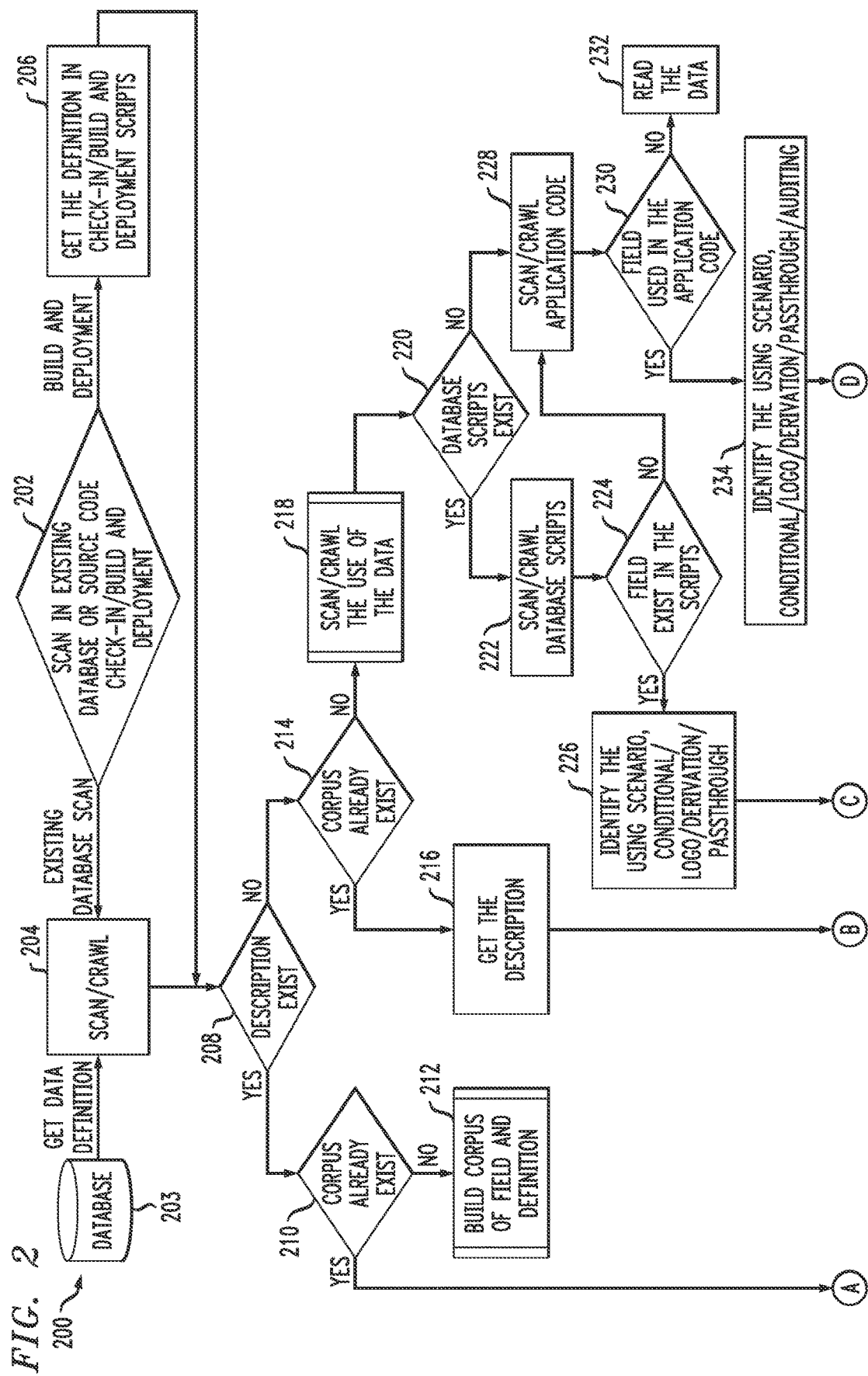
FIG. 2 illustrates a database management methodology according to an illustrative embodiment.
Figure 2:
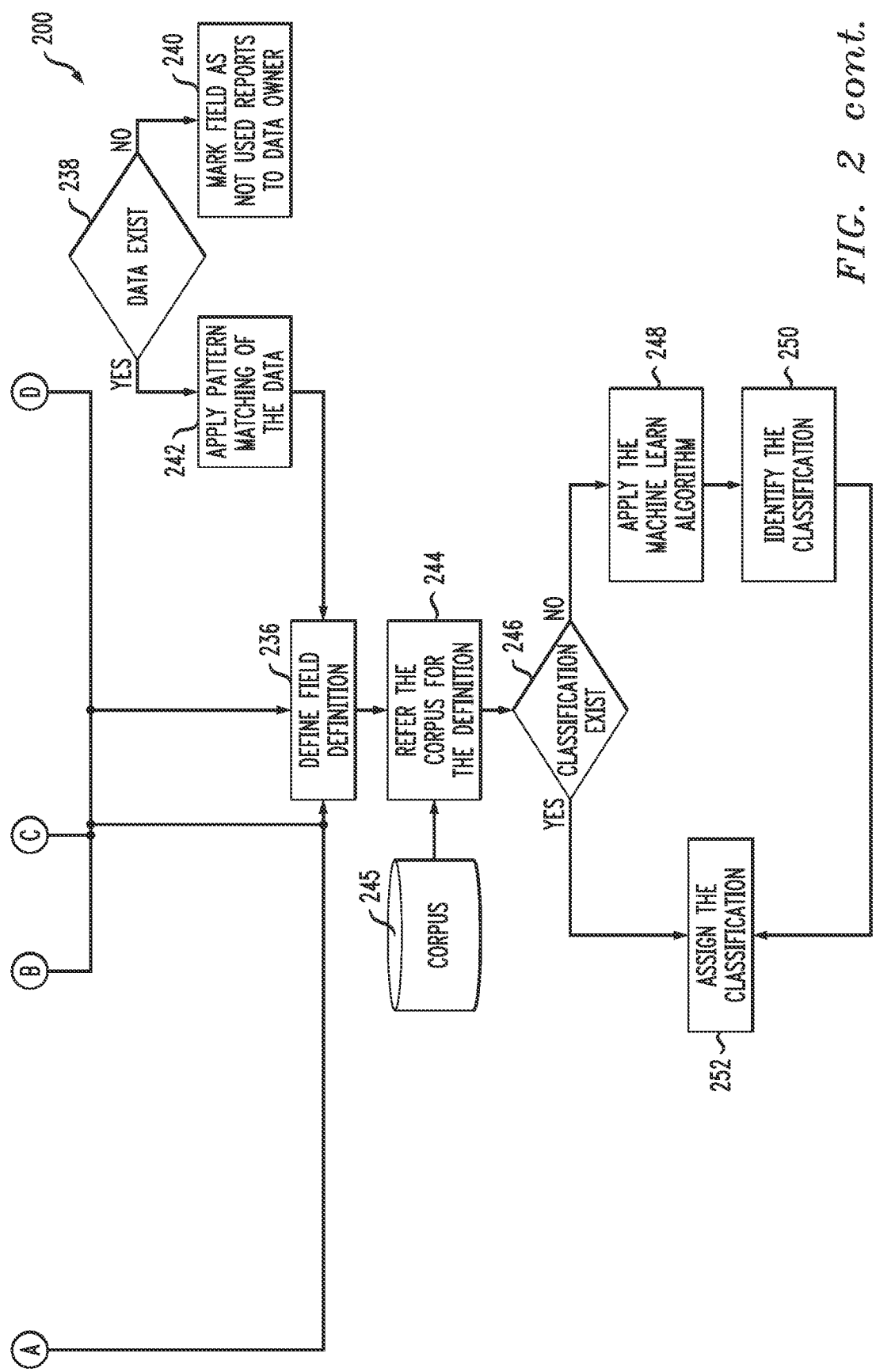

Referring now to FIG. 2, a data management methodology 200 is depicted which, in one or more illustrative embodiments, can be implemented in data management system 110 of FIG. 1 as part of intelligent data definition and classification functionalities 112.

As shown in step 202, data management methodology 200 first determines whether or not there is an existing database, e.g., one or more of data sources 102 in FIG. 1. When there is an existing database, such as database 203, step 204 scans/crawls (analyzes) the data in database 203. When there is no existing database, it is assumed that one is being built or deployed, in which case, step 206 obtains definitions and scripts for the newly built/deployed database.

In step 208, data management methodology 200 determines whether or not a description exists. When step 208 determines that a description exists, then in step 210, it is determined whether or not a corpus exists. When step 210 determines that no corpus exists, then step 212 builds a corpus of fields and definitions. When step 210 determines a corpus exists, then data management methodology 200 proceeds as will be further explained below.

Returning to step 208, it is determined that a description does not exist, then in step 214, it is determined whether or not a corpus exists. When step 214 determines that a corpus exists, then in step 216, the description is obtained and data management methodology 200 proceeds as will be further explained below. When step 214 determines that no corpus exists, then step 218 scans/crawls (analyzes) usage information for the data.

Then, in step 220, it is determined whether or not database scripts exist. When database scripts do exist, then step 222 scans/crawls (analyzes) the database scripts. Step 224 then determines whether or not fields exist in the database scripts. When fields exist, step 226 identifies use scenario, conditional, loop derivation and passthrough conditions. Data management methodology 200 then proceeds as will be further explained. When step 220 determines that no database scripts exist and when step 224 determines that no fields exist, then step 228 scans/crawls (analyzes) the application code. Step 230 determines whether or not fields are used in the application code. When step 230 determines no fields are used in the application code, step 232 reads the data. When step 230 determines that fields are used in the application code, step 234 identifies use scenario, conditional, loop derivation, passthrough and auditing conditions. Data management methodology 200 then proceeds as will be further explained.

Steps 216, 226 234, and step 210 with an affirmative determination, proceed to step 236. In addition, step 238 determines whether or not data exists. When step 238 determines that no data exists, then step 240 marks the field as not used and reports to the data owner. When step 238 determines that data exists, then step 242 applies pattern matching to the data, and then proceeds to step 236 where data management methodology 200 defines field definitions.

Step 244 then refers to corpus 245 for the definition, and step 246 then determines whether or not a classification exists. When step 246 determines no classification exists, then step 248 applies a machine learning algorithm and a classification is identified in step 250. Step 252 assigns the classification from step 250 to the data or the classification determined to exist in step 246.

Illustrative embodiments, in accordance with data management methodology 200, provide functionalities to scan/crawl (analyze) a database/application to learn about usage, context, and domain of the data and to build a metadata repository. Further, database field, data patterns and application code are scanned/crawled by leveraging this repository. Based on the data management analyses, illustrative embodiments can make decisions or facilitate decisions on behalf of a data owner including decisions such as, but not limited to, use case scenarios, mathematical logic, and derivation rules.

Furthermore, illustrative embodiments, in accordance with data management methodology 200, create a knowledge repository as part of an expert system (e.g., 112 and 114 in FIG. 1 collectively forming an expert system) that learns over time. This approach enables metadata subject matter expertise. The knowledge repository generates recommendations for data definitions and classifications of the data. More particularly, illustrative embodiments: scan, analyze, and crawl the various code repositories (e.g., part of data sources 102); learn and categorize existing data field definitions and usage; build subject matter expertise of the data; and provide generically designed technical solutions to scale to understand country-specific policies/doctrine.

Illustrative embodiments, as will be further described in conjunction with subsequent figures that enable one or more steps of data management methodology 200, comprise a combination of components that provide the following functionalities:

(i) Data field usage identifier using data-flow analysis: this functionality comprises techniques that derive information about the flow of data along program execution paths to identify field definitions used to drive some value, e.g.: Pin_Code in an address is used to derive a location of a person; Val_Date is used to validate a product; Age is determined to validate the person's usage of a product; and Prod_Cost is determined to define a value of a product.

(ii) Data field dictionary: this functionality maintains industry-wide standardized fields and their definitions, and serves as a repository for industry reference and personalized organization-wide standards.

(iii) Corpus data builder: this functionality trains the data field definition. Corpus data contains the fields and standard field tagging and the domain associated with each field.

(iv) Approximate string-matching algorithms: also known as fuzzy string searching, this functionality searches for substrings of the field with a data field repository to build the corpus.

(v) Data flow analysis: this functionality decides field usage, and uses keys such as, but not limited to, primary, unique, and foreign keys to drive data lineage to identify a data subject and data controller as per the General Data Protection Regulation (GDPR). The GDPR was enacted in 2016 by the European Union (EU) to regulate data protection and privacy with the EU. As referenced therein: a data controller is an entity that determines the purposes of any personal data and the means of processing it; a data processor is an entity that processes personal data on behalf of a data controller; and a data subject is an entity whose personal data is collected, held or processed by another entity.

Figure 3:
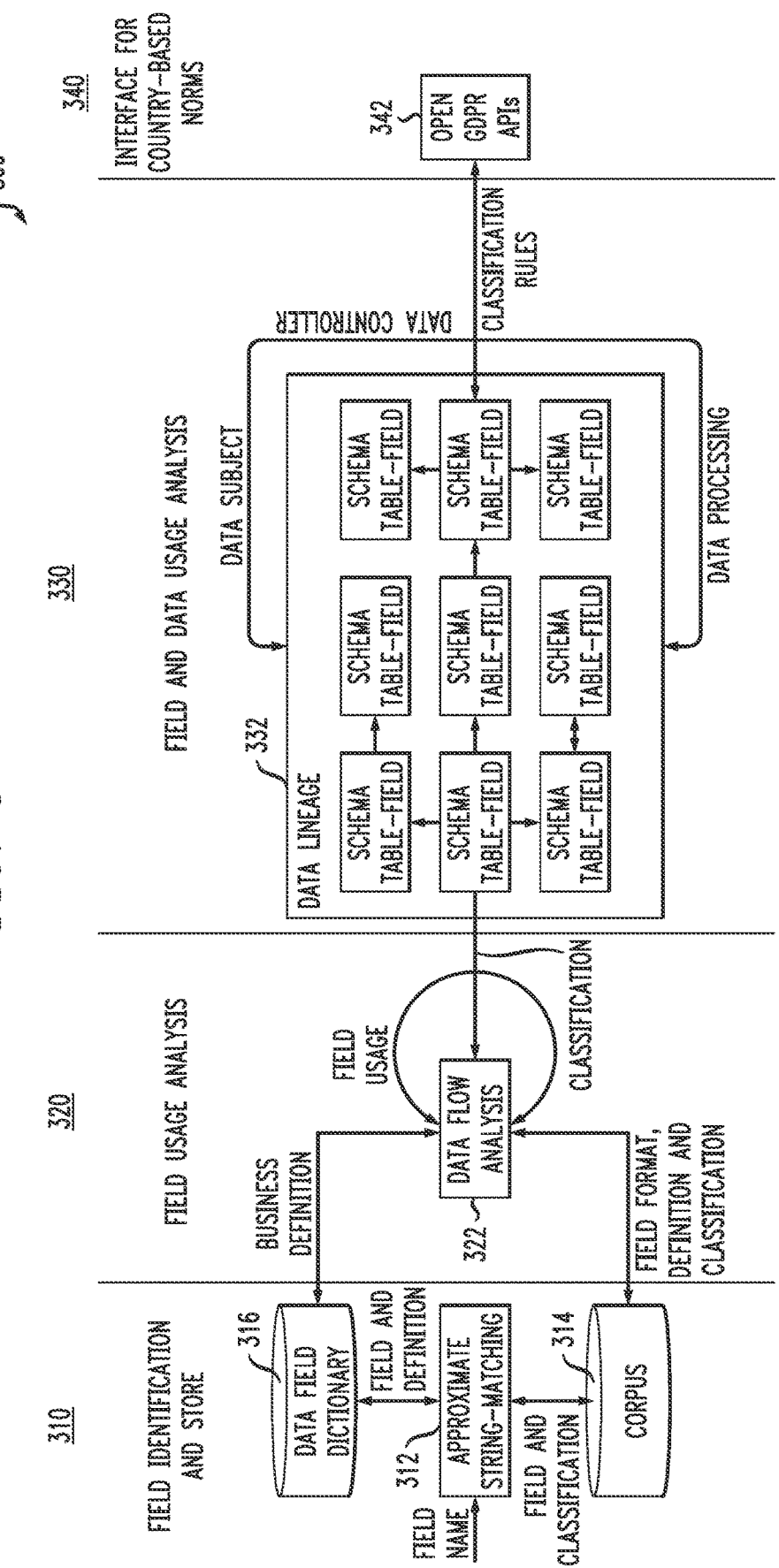
FIG. 3 illustrates a data management processing architecture according to an illustrative embodiment.

FIG. 3 illustrates an illustrative embodiment integrating the above functionalities. More particularly, FIG. 3 depicts a processing architecture 300 for implementing data management methodology 200 of FIG. 2. Processing architecture 300 comprises four main parts operatively coupled as shown: field identification and store 310, field usage analysis 320, field and data usage analysis 330, and interface for country-based norms 340. Field identification and store 310 comprises an approximate string-matching module 312 operatively coupled to a corpus store 314 and a data field dictionary store 316. Field usage analysis 320 comprises a data flow analysis module 322. Field and data usage analysis 330 comprises a data lineage module 332. Interface for country-based norms 340 comprises one or more open GDPR application programming interfaces (APIs) 342.

Data flow analysis module 322 is information-oriented and is configured to dynamically (e.g., in real-time) identify the data flow between components and data field life cycles such as, but not limited to, input, output, and process steps. A data-flow value for a program point represents an abstraction of the set of all possible program states that can be observed for that point. The set of all possible data-flow values is the domain for the application under consideration. For example, for the problem of reaching the definition, the domain of data-flow values is the set of all subsets of definitions in the program. A particular data-flow value is a set of definitions IN[s] and OUT[s]: data-flow values before and after each statement. The data-flow problem is to find a solution to a set of constraints on IN[s] and OUT[s] for all statements. Also, with this analysis, the usage of the data field (i.e., indicative of how and where the data field has been used).

Figure 4:
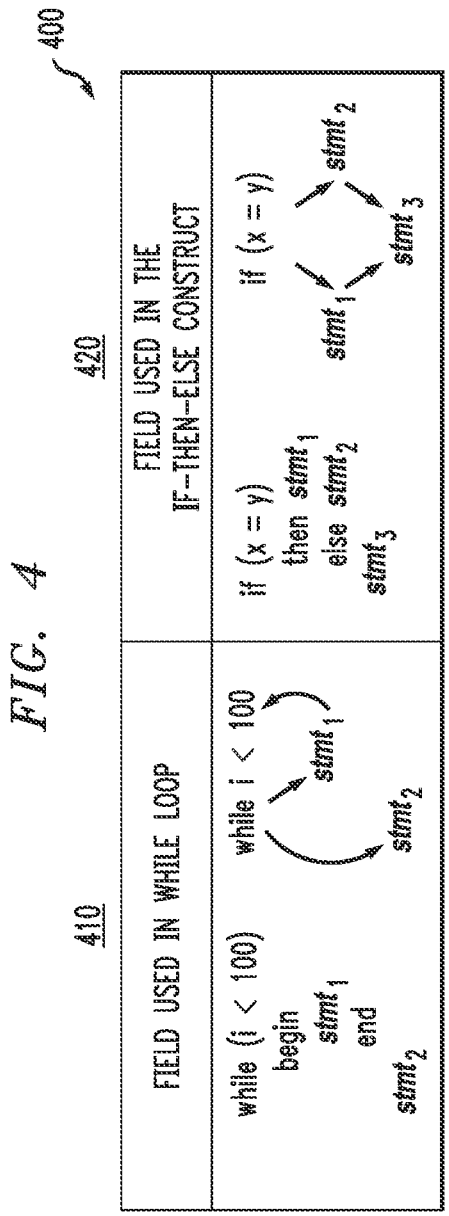
FIG. 4 illustrates field use examples according to an illustrative embodiment.

Table 400 in FIG. 4 shows examples of data field usage information. For example, in view 410, if the field is used in a while loop condition, reference would infer the field usage and construct the field definition. View 420 represents a field used in an if-then-else construct. The field usage helps identify the usage density, i.e., the field used as reference data, or mathematical logic such as proposition, variable, formula, arithmetic, etc. Also, code analysis identifies fields used in control, data or interface scenarios, to derive definitions. Control analysis focuses on the control flow in a calling structure. For example, a control flow could be a process, function, method, or subroutine.

Further, data flow analysis module 322 ensures field data is used while also ensuring a particular data field is operating. Interface analysis checks the code and ensures the field interface fits into the model and simulation.

Data field dictionary store 316 is a repository configured to accumulate business and usage-based definitions of standard definitions. Table 500 in FIG. 5 shows an example of data stored in data field dictionary store 316. The data field dictionary store 316 can be preloaded with an industry dictionary. The data chief architect team can verify this centralized industry dictionary and also build an organization-specific definition. Further, the field definitions can be identified and stored in data field dictionary store 316 using code analysis.

Still further, it is to be appreciated that corpus data contains, but is not limited to, standard tags and domains associated with the fields. Corpus store 314 is referred to before processing the string comparison analysis performed by approximate string-matching module 312.

Approximate string-matching module 312 is configured to execute one or more string matching (string similarity) algorithms. Based on the properties of operations, string matching algorithms can be categorized into domains such as edit distance-based, token-based, and sequence-based. Illustrative embodiments implement a sequence-based algorithm in the form of the Ratcliff/Obershelp algorithm.

In general, the Ratcliff/Obershelp algorithm computes the similarity of two strings (e.g., list of characters) as the number of matching characters divided by the total number of characters in the two strings (also referred to herein as pattern matching). Matching characters are those in the longest common substring plus, recursively, matching characters in the unmatched region on either side of the longest common substring. In terms of illustrative embodiments, the Ratcliff/Obershelp algorithm finds the longest common substring between the data field dictionary and the data field that needs to be mapped. The algorithm removes that part from both strings and splits at the exact location. This breaks the strings into two pieces, one left and another to the right of the found common sub string. The algorithm then takes the left part of both strings and calls the function again to determine the longest common substring. This process is repeated recursively. The Ratcliff/Obershelp algorithm is expressed by the formula:

$$D_{ro} = \frac{2 * K_m}{|S_1| + |S_2|}.$$

$K_m$ is a number of matching characters, $|S1|$ and $|S2|$ are lengths of strings S1 and S2, respectively, where the similarity metric can take a value between zero and one.

Table 600 in FIG. 6A represents an example of similarity metric computations in the Ratcliff/Obershelp algorithm for two strings S1 and S2 which each include a list of characters as shown. The length of the string S1 is 12, i.e., $|S1|$:12, and the length of the string S2 is 9, i.e., $|S1|$:9.

As shown in table 610 in FIG. 6B, the longest substring that the two strings have in common is [CUSTNAME]. Therefore, CUSTNAME is an anchor, and $K_m$=[CUST]+[NAME]=8

$$\frac{2Km}{|S1|+|S2|} = \frac{2 \cdot (|"CUST"|+|"NAME"|)}{|S1|+|S2|} = \frac{2^*(4+4)}{12+9} = \frac{16}{21} = 1.33$$

Thus, the similarity metric is 1.33 which indicates that Cust_Name matches with Customer Name. As such, when this field's context subsequently arrives during real-time data processing operations, the field definition is identified and added automatically.

Referring now to data usage analysis, data lineage module 332 utilizes a decision tree algorithm according to an illustrative embodiment. Recall that, as per GDPR, the data subject can be the person to whom the data relates, and the data controller can be the company or an individual who has overall control over the processing of the data. The data subject and data controller drive the classification with country-specific open GDPR APIs 342.

Figure 7:
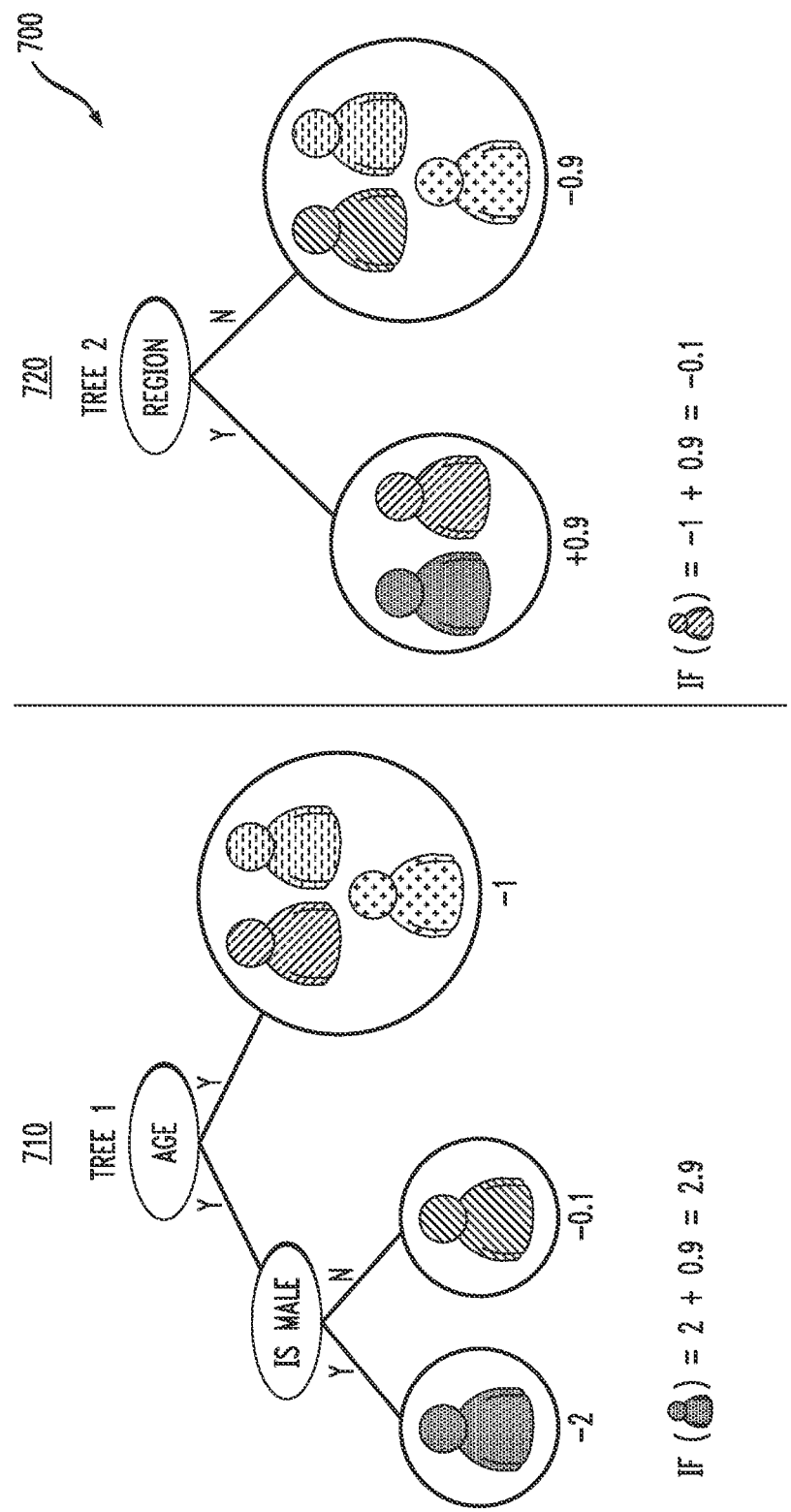
FIG. 7 illustrates a decision tree classification example according to an illustrative embodiment.
Figure 8:
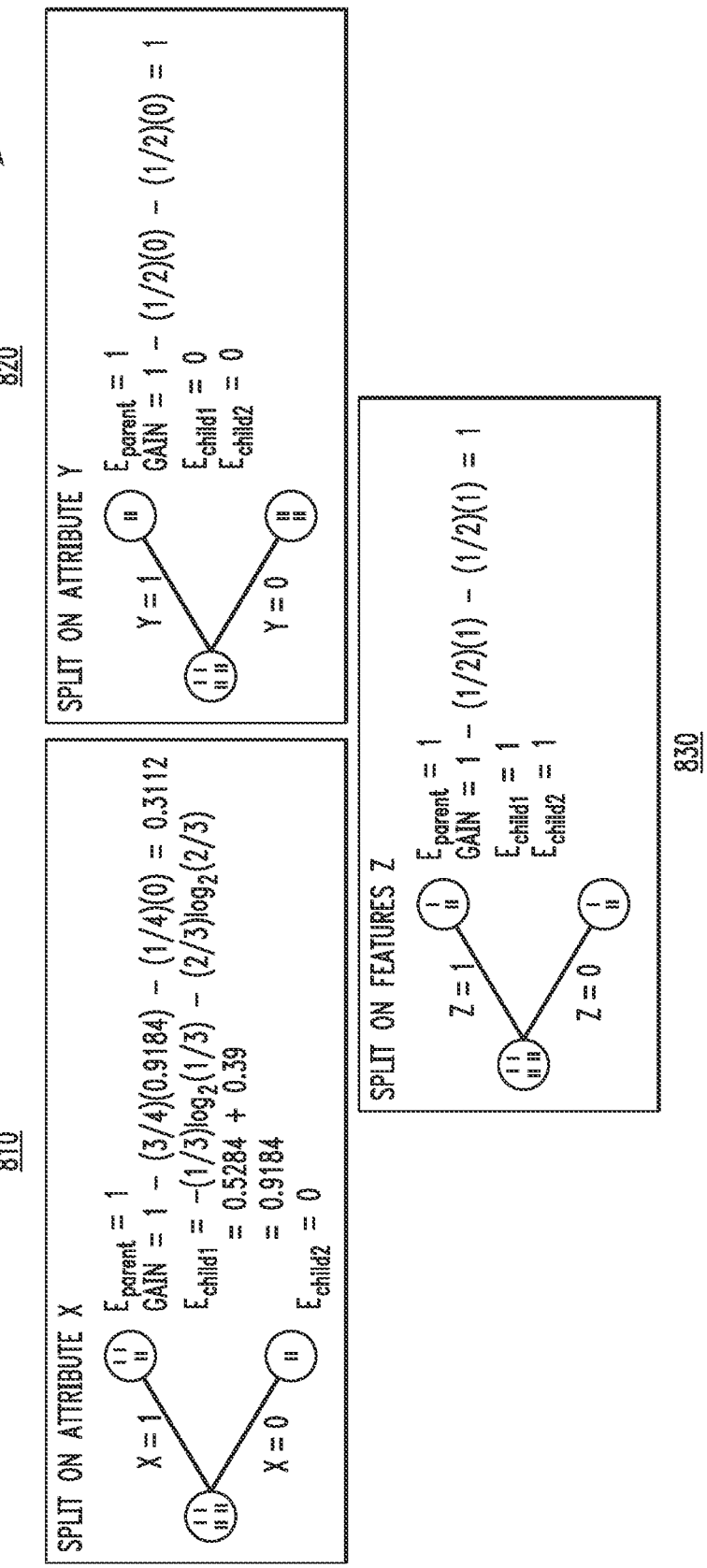
FIGS. 8 and 9 illustrate a decision tree information gain example according to an illustrative embodiment.

The lineage gives the number of places that the data is being used or referred to. The decision tree algorithm in data lineage module 332 helps to identify domains such as, by way of example only, data personal, finance, inventory, cost, information technology, human resources, etc., in a company context. The decision tree algorithm in data lineage module 332 constructs the tree based on the attributes and ends with leaf nodes or final class labels. The algorithm also identifies the correct attribute to classify the nodes. It is realized herein that identifying the correct attribute is a key technical challenge for the decision tree. More particularly, in the decision tree, a primary technical challenge is identifying the root node's attribute in each level. This process is known as attribute selection. Entropy techniques are used to identify the correct attribute. Entropy ensures the purity of the split. For example, as shown in view 700 of FIG. 7 for a decision tree 710 and a decision tree 720, if Age splits the attribute, more node splitting is required to classify the data. But the entropy has to be applied at each node or attribute to find purity.

But there could be many entropies that will be pure to get the node's appropriate purity. Thus, data lineage module 332 can employ a decision tree information gain algorithm to build a decision tree using information gain. The algorithm takes each of the features and calculates the information for each feature. As shown in view 800, assume there are three attributes X (image 810), Y (image 820) and Z (image 830).

Figure 9:
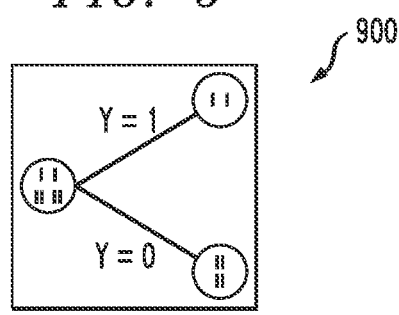

From the images 810, 820 and 830, it is evident that the information gain is maximum when the algorithm splits on feature Y. So, for the root node, the best-suited feature is feature Y. While splitting the dataset by feature Y, the child node contains a pure subset of the target variable. Thus, the dataset does not need to be split any further. The final tree for the dataset is shown as image 900 in FIG. 9.

Figure 10:
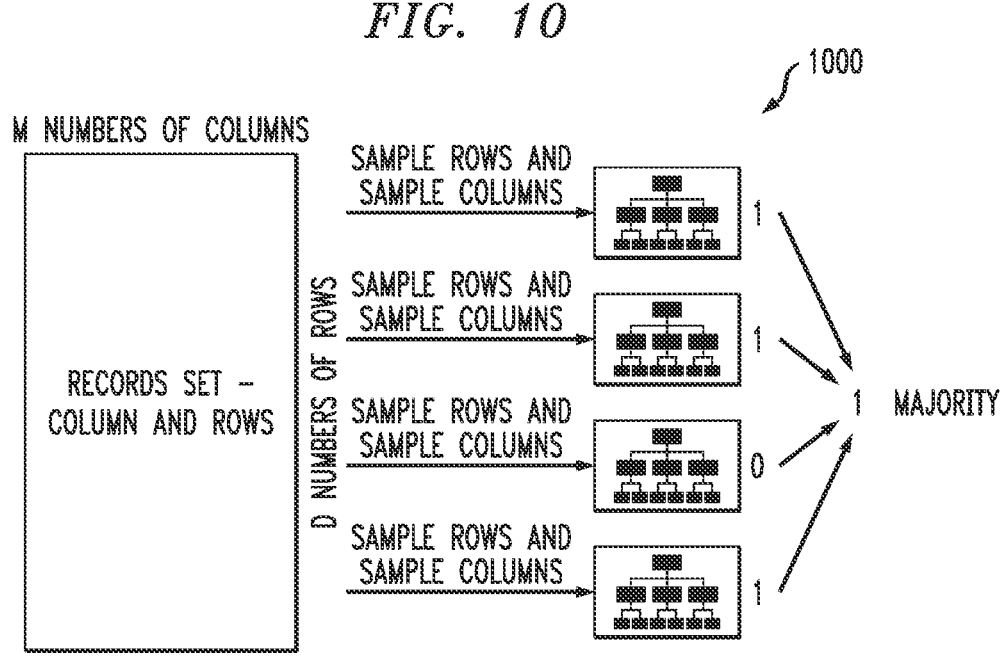
FIG. 10 illustrates a random forest class prediction example according to an illustrative embodiment.

Still further, to obtain the best set of data, illustrative embodiments apply a random forest algorithm. A random forest consists of a large number of individual decision trees that operate as an ensemble. Each tree in the random forest outputs out a class prediction, and the class with the most votes [Majority] becomes the prediction, as shown in random forest algorithm 1000 in FIG. 10.

When more decision trees are used, the algorithm gives two values: low depth bias and high variance. When the tree receives depth during the low bias, the training data is appropriately trained, and the error will be more minor. When the training data has less information, a high variance will be created. As more decision trees are combined in a random forest, the high variance turns into low variance, yielding more accuracy.

Illustrative embodiments of processing platforms that can implement the features of FIGS. 1-10 will now be described in greater detail with reference to FIGS. 11 and 12.

FIG. 11 shows an example processing platform comprising cloud infrastructure 1100. The cloud infrastructure 1100 comprises a combination of physical and virtual processing resources that may be utilized to implement at least a portion of the information processing systems described herein. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components described herein may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of one or more systems described herein and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212. The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and systems and processes described herein may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionalities of one or more modules of a multi-model and clustering database system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and database management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processor coupled to at least one memory, the at least one processor, when executing program code, is configured to:
   analyze one or more data sources, wherein each of the one or more data sources comprise a set of metadata and usage information associated with the set of metadata;
   determine at least one of data definitions and data classifications for the one or more sets of metadata across the one or more data sources; and
   store the at least one of data definitions and data classifications for the one or more sets of metadata in a repository;
   wherein determining the data definitions for the one or more sets of metadata across the one or more data sources is based in part on a number of matching characters in a first string associated with at least a portion of the set of metadata and a second string associated with a standardized set of metadata;
   wherein determining the data classifications for the one or more sets of metadata across the one or more data sources is based in part on the use of one or more machine learning algorithms; and
   wherein the one or more machine learning algorithms comprise one or more decision tree-based algorithms.

2. The apparatus of claim 1, wherein the at least one processor, when executing program code, is further configured to access the repository to facilitate a subsequent search of the one or more data sources.

3. The apparatus of claim 1, wherein at least one of the one or more data sources comprises a database.

4. The apparatus of claim 3, wherein at least one of the one or more data sources comprises application code associated with data stored in the database.

5. The apparatus of claim 1, wherein the data definitions are determined using a string matching algorithm.

6. The apparatus of claim 5, wherein the string matching algorithm is a Ratcliff/Obershelp-based algorithm.

7. The apparatus of claim 5, wherein the string matching algorithm is configured to, for each set of the one or more sets of metadata, compare at least a portion of the set of metadata to the standardized set of metadata to generate a similarity metric based on the comparison.

8. The apparatus of claim 1, wherein the one or more decision tree-based algorithms compute at least one class prediction for each of the one or more sets of metadata.

9. The apparatus of claim 1, wherein the usage information associated with each of the one or more sets of metadata comprises information indicative of a flow of data along a program execution path.

10. The apparatus of claim 1, wherein the data definitions comprise data field definitions associated with each of the one or more sets of metadata.

11. A method comprising:
  analyzing one or more data sources, wherein each of the one or more data sources comprise a set of metadata and usage information associated with the set of metadata;
  determining at least one of data definitions and data classifications for the one or more sets of metadata across the one or more data sources; and
  storing the at least one of data definitions and data classifications for the one or more sets of metadata in a repository;
  wherein the determining of the data definitions for the one or more sets of metadata across the one or more data sources is based in part on a number of matching characters in a first string associated with at least a portion of the set of metadata and a second string associated with a standardized set of metadata;
  wherein determining the data classifications for the one or more sets of metadata across the one or more data sources is based in part on the use of one or more machine learning algorithms;
  wherein the one or more machine learning algorithms comprise one or more decision tree-based algorithms; and
  wherein the analyzing, determining and storing steps are executed by at least one processor coupled to at least one memory comprising executable program code.

12. The method of claim 11, further comprising accessing the repository to facilitate a subsequent search of the one or more data sources.

13. The method of claim 11, wherein at least one of the one or more data sources comprises at least one of a database and application code associated with data stored in the database.

14. The method of claim 11, wherein the data definitions are determined using a string matching algorithm.

15. The method of claim 14, wherein the string matching algorithm is configured to, for each set of the one or more sets of metadata, compare at least a portion of the set of metadata to the standardized set of metadata to generate a similarity metric based on the comparison.

16. The method of claim 11, wherein the one or more decision tree-based algorithms to compute at least one class prediction for each of the one or more sets of metadata.

17. The method of claim 11, wherein the usage information associated with each of the one or more sets of metadata comprises information indicative of a flow of data along a program execution path.

18. A computer program product comprising a non-transitory processor-readable storage medium having stored therein program code of one or more software programs, wherein the program code, when executed by at least one processor, cause the at least one processor to:
  analyze one or more data sources, wherein each of the one or more data sources comprise a set of metadata and usage information associated with the set of metadata;
  determine at least one of data definitions and data classifications for the one or more sets of metadata across the one or more data sources; and
  store the at least one of data definitions and data classifications for the one or more sets of metadata in a repository;
  wherein the determining of the data definitions for the one or more sets of metadata across the one or more data sources is based in part on a number of matching characters in a first string associated with at least a portion of the set of metadata and a second string associated with a standardized set of metadata;
  wherein determining the data classifications for the one or more sets of metadata across the one or more data sources is based in part on the use of one or more machine learning algorithms; and
  wherein the one or more machine learning algorithms comprise one or more decision tree-based algorithms.

19. The computer program product of claim 18, wherein the data definitions are determined using a string matching algorithm, wherein the string matching algorithm is configured to, for each set of the one or more sets of metadata, compare at least a portion of the set of metadata to the standardized set of metadata to generate a similarity metric based on the comparison.

20. The computer program product of claim 18, wherein the one or more decision tree-based algorithms compute at least one class prediction for each of the one or more sets of metadata.

* * * * *

UNITED STATES PATENT AND TRADEMARK OFFICE
CERTIFICATE OF CORRECTION

PATENT NO. : 11,899,691 B2
APPLICATION NO. : 17/547540
DATED : February 13, 2024
INVENTOR(S) : Dhilip S. Kumar et al.

It is certified that error appears in the above-identified patent and that said Letters Patent is hereby corrected as shown below:

In the Claims

Claim 16, Column 11, Lines 41-42, delete "one or more decision tree-based algorithms to compute" and insert therefor --one or more decision tree-based algorithms compute--

Signed and Sealed this
Twelfth Day of March, 2024

Katherine Kelly Vidal
Director of the United States Patent and Trademark Office